Figure 1:
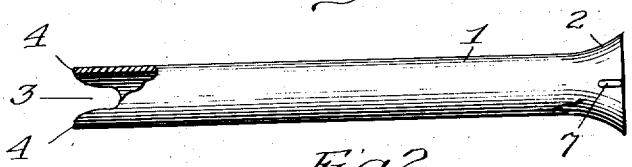

March 9, 1926. Re. 16,283

A. S. MITCHELL

PROCESS AND APPARATUS FOR STUFFING UPHOLSTERY

Original Filed Dec. 29, 1922 2 Sheets-Sheet 1

Inventor:
Allister S. Mitchell,
By Dyrenforth, Lee, Christy, Wills,
& Hips.

March 9, 1926. Re. 16,283

A. S. MITCHELL

PROCESS AND APPARATUS FOR STUFFING UPHOLSTERY

Original Filed Dec. 29, 1922 2 Sheets-Sheet 2

Inventor:
Allister S. Mitchell,
By Dyrenforth, Lee, Christton & Hicks,
Attys.

Reissued Mar. 9, 1926. Re. 16,283

UNITED STATES PATENT OFFICE.

ALLISTER S. MITCHELL, OF OAKLAND, CALIFORNIA, ASSIGNOR TO CALIFORNIA COTTON MILLS COMPANY, OF OAKLAND, CALIFORNIA, A CORPORATION OF CALIFORNIA.

PROCESS AND APPARATUS FOR STUFFING UPHOLSTERY.

Original No. 1,497,183, dated June 10, 1924, Serial No. 609,608, filed December 29, 1922. Application for reissue filed January 29, 1926. Serial No. 84,787.

*To all whom it may concern:*

Be it known that I, ALLISTER S. MITCHELL, a citizen of the United States, residing at Oakland, in the county of Alameda and State of California, have invented a certain new and useful Improvement in Processes and Apparatus for Stuffing Upholstery, of which the following is a specification.

This invention relates to a new and improved process and apparatus for inserting the padding or filling in the covering or piping in forming upholstery and the like. The invention has various applications and uses. One of the objects of the invention is the filling of the cushions for automobiles. These automobile cushions are made up of pleats or pipes which are made by fastening two strips of material together at intervals. These pipes or pleats are of various lengths and with my invention they can be easily and quickly filled with the padding regardless of the variations in length and the time required for this purpose may be very greatly reduced and the cost thereof greatly reduced and a better product secured. The invention has other objects which are more particularly pointed out in the following description.

Figure 3:
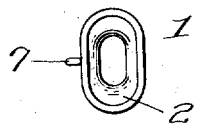
Figure 2:
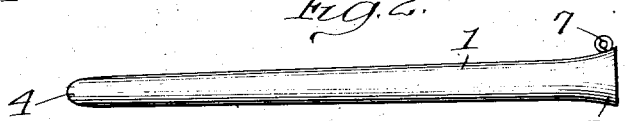
Figure 4:
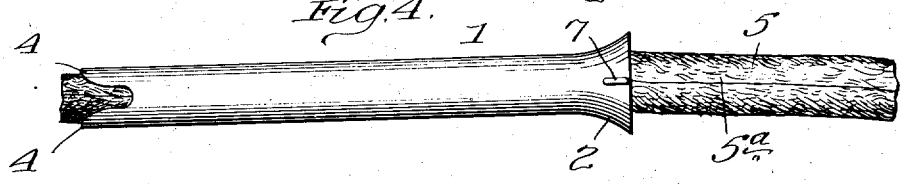
Figure 5:
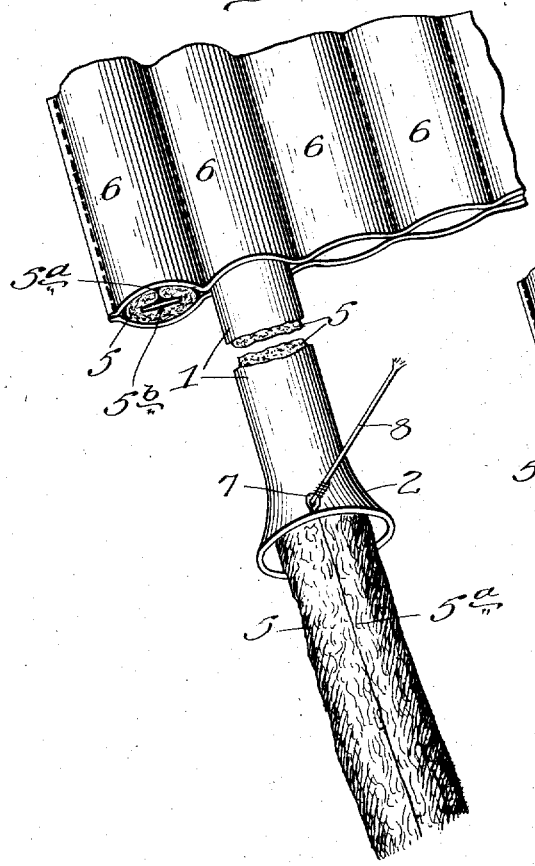
Figure 6:
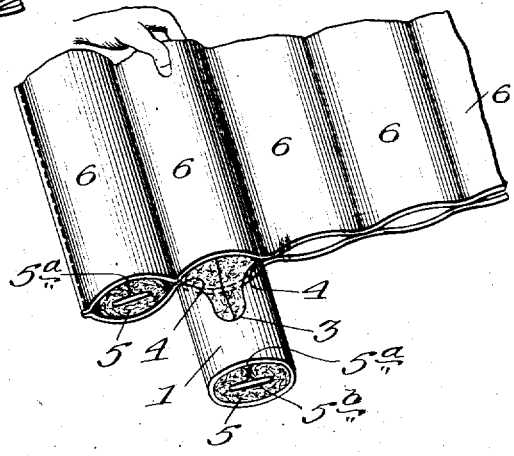
Figure 7:
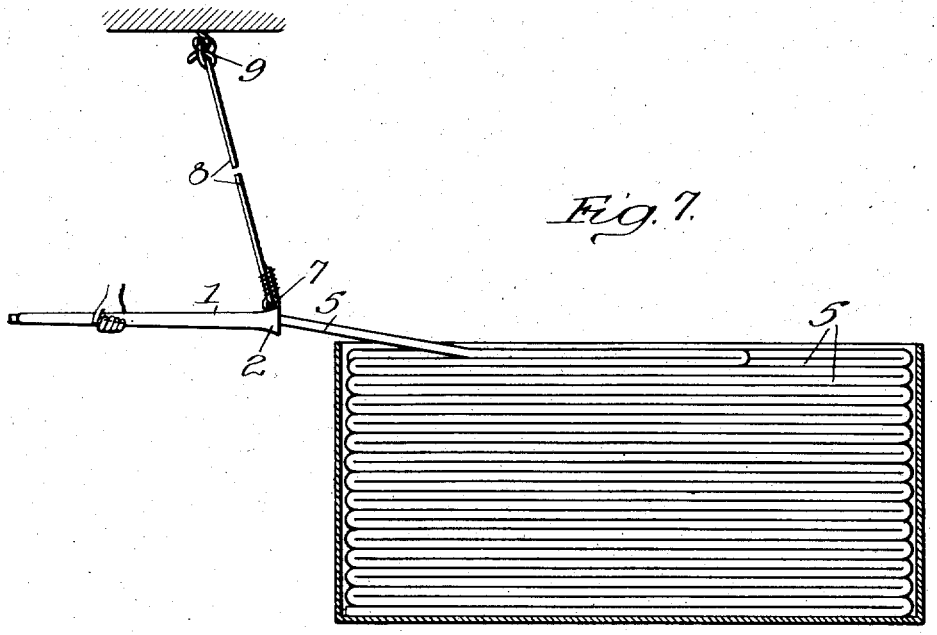
Figure 8:
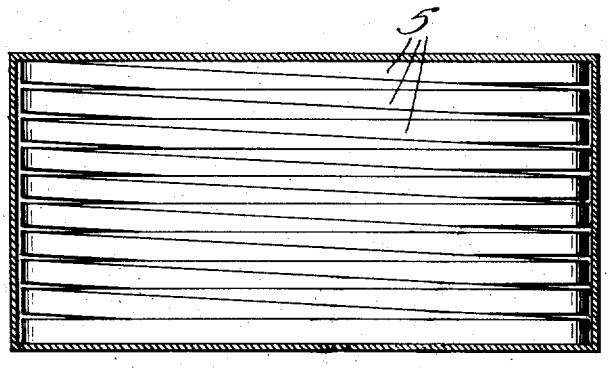

Referring now to the drawings:

Fig. 1 is a side view of one form of padding instrument used in carrying out the process; Fig. 2 is an edge view of the instrument shown in Fig. 1; Fig. 3 is an end view of the enlarged end of the instrument shown in Fig. 1; Fig. 4 is a view similar to Fig. 1 showing the padding or filling in the instrument; Fig. 5 is a view showing the instrument and the padding inserted in one of the pleats in the covering; Fig. 6 is a view similar to Fig. 5 showing the instrument withdrawn leaving the padding in the pleat; Fig. 7 is a view showing the filling folded back and forth upon itself in a box or container in connection with the method in which the operator uses the instrument and the filling for padding; Fig. 8 is a view showing the filling folded back and forth upon itself to form a compact mass.

Like numerals refer to like parts throughout the several figures.

For purposes of illustration I have shown the invention as used in connection with the filling of upholstery for automobiles, but it is of course evident that it may be used for any other purpose for which it is adapted.

In carrying out the invention I provide a tube or insertion-tool 1 which is preferably of metal which is hollow and which has preferably an opening with the cross section approximating that which the padding is finally to take. This tube 1 is open at both ends and preferably provided with the enlarged receiving opening 2 at the receiving end so as to facilitate the insertion of the padding therein. At the other end the tube is provided with the notches 3 which are arranged on opposite sides and which register so that the thumb and finger or any other suitable instrumentality may be placed therein to grasp the padding. I also prefer to make the edges 4 at the end of the tube sharp so that they can be used to easily separate or sever the padding as hereinafter described.

In carrying out the invention a long strip of padding 5 of whatever nature, such as cotton batting of any desired form is inserted in the tube as shown in Fig. 4 until a portion comes opposite the notches 3 at the end thereof. The tube, loaded with a compressed end-portion of the wadding-strip which is gripped therein, is then inserted in one of the pleats 6 as shown in Fig. 5 and pushed through the proper distance. The filling is then held by any desired instrument or by the thumb and finger of the operator, the operator placing his thumb and finger in the notches 3, and the tube is then moved backward out of the pleat to the position shown in Fig. 6, leaving the filling in the pleat. The holder is then moved laterally so as to disconnect the portion of the filling in the pleat from the portion of the filling in the tube. When the tube is moved backwardly out of the pleat a portion of the filling at the rear of the tube is pulled into the tube, and it will thus be seen that with this process the tube is, as it were, self-filling or self-threading. The tube is then inserted in another pleat and the above described process continued until all the pleats are filled. It will thus be seen that a strip of filling of any desired length can be used and that pleats of different lengths can be easily and quickly filled and that it is unnecessary to make the filling of any particular lengths in order to fill these various pleats of varying lengths. This invention therefore saves time in making it unnecessary for the operator to sort out fillings of particular lengths for particular pleats, it only being necessary to make long strips of filling material and a part thereof can then be inserted in the pleats and the rest disconnected from the portion in the pleats. This can be done at a high rate of speed and the cost of making the upholstery thus will be very greatly reduced.

In some of the pleats of the upholstery, the one end is closed and the other open. With such pleats or even with the pleats open at both ends it is only necessary to insert the tube with the filling therein in the pleat and then, by means of the thumb and finger or a suitable instrument, exert pressure on the pleat opposite the notches 3 as shown in Fig. 6 so as to hold the filling, whereupon the tube may then be withdrawn to the position shown in said figure. As before stated, the filling may be made up in strips of any desired length but I prefer to make it in long lengths. This filling can then as manufactured or at any other time be placed in a receptacle in layers extending back and forth across the receptacle, as shown for example in Fig. 7, and when it is desired to fill the upholstery it is only necessary to insert the end of the filling strip in the tube and then fill the various pleats, the tube being pulled back each time with a sliding, telescoping action on the strip so as to be self-filling, and this process continued until the entire strip is used up. I have found a convenient length of strip of the filling to be about five hundred yards as this facilitates handling and prevents waste, the filling being pulled out of the receptacle, a small portion of it at a time, as the tube is refilled and inserted in the next pleat. Since the tube grips the strip and serves as a means for drawing it from the receptacle as required, it is not necessary for the hand of the operator to touch the filling except the end of the strip he first inserts in the tube. It will further be seen that there is practically no waste with this process and apparatus. I prefer to make the edges 4 more or less pointed and sharp so as to make it easier to disconnect the portion of the filling in the pleat from that in the tube by the lateral movement before described.

The instrument or tube 1 is preferably of sufficient length so that it can be used with pleats of the longest length. It is not at all necessary that the tube be of the same length as the pleat in the covering, but only that it be of sufficient length to be easily inserted therein and removed therefrom. Ordinarily, it will be made longer than the pleats. The size of the tube may of course be varied, but it is preferably of such size as to easily fit into the pleat and to substantially fill the pleat and to be easily withdrawn. The filling is preferably compressed more or less in the holder and then expands so as to entirely fill the pleat when the tube is withdrawn.

I have described in detail a particular process and construction embodying the invention but it is of course evident that numerous variations may be utilized without departing from the spirit of the invention as embodied in the claims hereto appended and I therefore do not limit myself to the particular construction and details shown and described.

It will be noted that the filling is entirely covered by the tube and that the tube has a smooth bore. This gives a smooth finish to the outer faces of the filling and prevents it from becoming ruffled or otherwise distorted. I prefer to arrange the tube 1 so that the outer end can be hung up to facilitate the operation. In the construction shown there is a ring 7 attached to the tube and a flexible suspending device 8 is attached to a support 9. By means of this construction the tube, when being used, can be suspended in the proper position so that when the operator releases it it will be held so that he can again easily take hold of it. This permits him to use both hands for other purposes when this is desired without the tube dropping to the floor.

As indicated above, the wadding-strip which preferably is of cotton batting has its end-portion confined under compression within the tubular tool 1, so that when the tool is inserted in the pleat, the wadding-strip will be drawn from the holder, or container, as required; also, when the tool is withdrawn from the pleat, it slides upon the succeeding portion of the wadding-strip, the advance end of the wadding-strip at the remote end of the pleat being held or gripped by pinching the pleat, for example, as illustrated in Fig. 6, and thus the insertion-tool is automatically reloaded. Thus, it will be seen that the inserted portion of the wadding-strip, owing to the fact that it is held while the tubular insertion-tool is being withdrawn, serves, in effect, to draw a fresh portion of the wadding-strip into the insertion-tool, the portion of the strip thus drawn into the insertion-tool being placed under compression in this operation, as is obvious from Fig. 4.

The improved method of stuffing pleats renders unnecessary the use of mechanism for feeding the wadding material into the insertion-tool, or tubular horn. Preferably, the wadding-strip is rolled, or partially rolled, into compact form, as by turning, or folding, the lateral margins of the strip upon the medial portion, the lateral edges meeting at the line 5[a]. Also, it is preferred to enclose within the folded strip a reinforcing strip $5^b$, as shown in Fig. 6. This reinforcing strip may be a tough strip of paper, for example.

In some of the appended claims, the wadding-strip is designated as a continuous strip, meaning thereby a strip of sufficient length to repeatedly reload the insertion-tool and thus furnish the wadding material for a succession of pleats. The preferred method of severing the strip at the advance end of the tool after the tool has been withdrawn from the pleat is by a quick lateral movement, or lateral jerk of the advance end of the tool, as previously described.

I claim:

1. The process of forming pleated upholstery which consists in inserting a tube into one of the pleats, which tube contains the filling and withdrawing the entire tube as a unit.

2. The process of forming pleated upholstery which consists in inserting a tube containing the filling into one of the pleats and then holding the filling material in the pleat and simultaneously withdrawing the entire tube.

3. The process of forming pleated upholstery which consists in inserting a tube containing the filling into one of the pleats and then holding the filling material in the pleat and simultaneously withdrawing the entire tube and then disconnecting the portion of the filling in the pleat from the portion of the filling remaining in the tube by giving the tube a quick lateral movement.

4. An apparatus for filling upholstery which consists of a hollow tube having a cross section substantially the size of the pleats in the covering, said tube adapted to receive a strip of filling material and to be inserted in the pleat of the upholstery covering and provided at its end with cut away portions whereby the strip of filling material may be grasped with the fingers as the tube is being withdrawn from the pleat.

5. An apparatus for filling upholstery which consists of a hollow tube having a cross section substantially the size of the pleats in the covering, said tube adapted to receive a strip of the filling material and to be inserted in the pleat of the upholstery covering and provided at its ends with cut away portions whereby the strip of filling material may be grasped with the fingers as the tube is being withdrawn from the pleat, said tube being provided at its end with means for disconnecting the portion of the filling in the pleat from the portion of the filling in the tube.

6. An apparatus for filling upholstery which consists of a hollow tube having a cross section substantially the size of the pleats in the covering, said tube being adapted to receive a strip of the filling material and to be inserted in the pleat of the upholstery covering and provided at its end with cut away portions whereby the strip of filling material may be grasped with the fingers as the tube is being withdrawn from the pleat, said tube being provided at its end with a cutting edge for severing the portion of the filling in the pleat from the portion of the filling in the tube.

7. The process of forming upholstery which consists in forming the covering into pleats, forming the filling into long strips, inserting the end of the strip of filling material into a tube, inserting the tube into one of the pleats, holding the filling against removal, withdrawing the tube so as to discharge a portion of the filling into the pleat and refill the tube, and then disconnecting the portion of the filling in the tube from that in the pleat by a quick lateral movement of said tube.

8. The process of forming pleated upholstery which comprises: threading a tubular insertion-tool with the advance end of a continuous wadding-strip and reciprocating the insertion-tool with relation to the pleat, the advance movement of the tool serving to introduce the advance end of the wadding-strip into the pleat and the return movement of the tool serving to reload the tool, the inserted portion of the wadding-strip being held during the return movement of the tool and serving to draw a fresh portion of the wadding-strip into the insertion-tool during the return movement of said tool.

9. In a process of stuffing a pleated upholstery envelop, the steps which comprise loading a tubular insertion-tool with an end-portion of a wadding-strip which is of sufficient length to repeatedly reload the tool, inserting the loaded tool into the pleats in succession and withdrawing the tool while retaining in the pleat the inserted portion of the strip, thus reloading the tool at each withdrawal thereof, and severing the strip at the advance end of the tool after each withdrawal.

10. The process of stuffing pleats in an upholstering operation which comprises: introducing into the pleats in succession successive portions of a resilient wadding-strip while held under compression within a hollow insertion-tool which is open at both ends and capable of sliding on said strip, retaining in each pleat the introduced strip-portion while withdrawing the insertion-tool and thus automatically reloading the tool, and severing the strip at the advance end of the tool after it has served to effect such reloading.

11. In an upholstering operation the process of stuffing pleats which comprises: employing an insertion-tool which envelops and compresses an end-portion of a resilient wadding-strip which is of sufficient length to repeatedly recharge said tool as a means for introducing successive portions of said strip into the successive pleats, pinching the loaded pleat and inserted strip at the advance end to thus retain the introduced portion and withdrawing the tool from the pleat, thus employing the introduced portion as a means for effecting automatic reloading of the tool, and severing the strip at the advance end of the tool after such automatic reloading has been effected.

12. In forming pleated upholstery the process which comprises: inserting a tubular hand-tool containing a compressed end-portion of a continuous resilient wadding-strip into a pleat, holding the advance end of the inserted portion at the remote end of the pleat and withdrawing the tool and thus leaving the pleat filled and the tool recharged, and severing the wadding-strip at the advance end of said tool.

13. The process of filling an upholstery envelop provided with a series of pleats which comprises: inserting into the pleats in succession an integral tubular hand-tool having a smooth bore containing under compression the advance end-portion of a resilient continuous wadding-strip, compressing the pleat at its remote end and thus holding the interposed extremity of the wadding-strip and withdrawing the tool after each insertion, thus leaving the pleat filled and the tool recharged by the next succeeding portion of the wadding-strip, and severing the wadding-strip at the advance end of the tool after such reloading has been effected.

ALLISTER S. MITCHELL.